(12) United States Patent
Jaynes et al.

(10) Patent No.: US 7,740,361 B2
(45) Date of Patent: Jun. 22, 2010

(54) ALIGNMENT OPTIMIZATION IN IMAGE DISPLAY SYSTEMS EMPLOYING MULTI-CAMERA IMAGE ACQUISITION

(75) Inventors: Christopher O. Jaynes, Lexington, KY (US); Stephen B. Webb, Louisville, KY (US)

(73) Assignee: Mersive Technologies, Inc., Lexington, KY (US)

( * ) Notice: Subject to any disclaimer, the term of this patent is extended or adjusted under 35 U.S.C. 154(b) by 582 days.

(21) Appl. No.: 11/737,823

(22) Filed: Apr. 20, 2007

(65) Prior Publication Data

US 2007/0273795 A1  Nov. 29, 2007

Related U.S. Application Data

(60) Provisional application No. 60/745,348, filed on Apr. 21, 2006.

(51) Int. Cl.
*G03B 21/00* (2006.01)
*G03B 21/26* (2006.01)
*G09G 5/00* (2006.01)

(52) U.S. Cl. .......................... 353/122; 353/30; 353/94; 345/1.3

(58) Field of Classification Search ................. 353/122, 353/30–37, 48, 69, 121, 94; 345/1.3
See application file for complete search history.

(56) References Cited

U.S. PATENT DOCUMENTS 4,974,073 A  11/1990  Inova (Continued)

FOREIGN PATENT DOCUMENTS

JP  2007180979 A  7/2007

OTHER PUBLICATIONS

Raskar, Ramesh et al.; Seamless Projection Overlaps using Image Warping and Intensity Blending; Fourth International Conference on Virtual Systems and Multimedia; Nov. 1998; pp. 1-5; Gifu, Japan.

(Continued)

*Primary Examiner*—Thanh X Luu
(74) *Attorney, Agent, or Firm*—Dinsmore & Shohl LLP

(57) ABSTRACT

The present invention relates to projection systems where one or more projectors are utilized to project a video, a still image, or combinations thereof. More particularly, the present invention relates to methods of calibrating and operating such systems. According to one embodiment of the present invention, a method of operating an image display system is provided. According to the method, one or more image sensors acquire respective overlapping portions $I_1$, $I_2$ of a projected image. Screen position coordinates for image fiducials in the first and second portions $I_1$, $I_2$ of the projected image are identified and used to establish first and second sets of distance metrics $D_1$, $D_2$ for the first and second portions of the projected image. A global point set is constructed from the first and second sets of distance metrics $D_1$, $D_2$. Global points within a region where the first and second portions $I_1$, $I_2$ of the projected image overlap are derived from only one of the first and second sets of distance metrics $D_1$, $D_2$. In this manner, a first subset $G_1$ of the global point set will comprise fiducial positions derived from only one of the first and second sets of distance metrics $D_1$, $D_2$ and a second subset $G_2$ of the global point set will comprise fiducial positions derived from the other of the first and second sets of distance metrics $D_1$, $D_2$. Alignment of the first and second subsets $G_1$, $G_2$ of the global point set is optimized by adjusting fiducial positions in the global point set in a manner that at least partially accounts for differences between local positional data derived from the first and second sets of distance metrics $D_1$, $D_2$ and global positional data of the fiducial positions in the global point set. Additional embodiments are disclosed and claimed.

20 Claims, 8 Drawing Sheets

U.S. PATENT DOCUMENTS

| | | | |
|---|---|---|---|
| 5,136,390 | A | 8/1992 | Inova et al. |
| 5,734,446 | A | 3/1998 | Tokoro et al. |
| 6,115,022 | A | 9/2000 | Mayer, III et al. |
| 6,222,593 | B1 | 4/2001 | Higurashi et al. |
| 6,434,265 | B1 | 8/2002 | Xiong et al. |
| 6,456,339 | B1 | 9/2002 | Surati et al. |
| 6,480,175 | B1 | 11/2002 | Schneider |
| 6,545,685 | B1 | 4/2003 | Dorbie |
| 6,570,623 | B1 | 5/2003 | Li et al. |
| 6,590,621 | B1 | 7/2003 | Creek et al. |
| 6,633,276 | B1 | 10/2003 | Jaynes |
| 6,695,451 | B1 | 2/2004 | Yamasaki et al. |
| 6,733,138 | B2 * | 5/2004 | Raskar ............... 353/94 |
| 6,753,923 | B2 | 6/2004 | Gyoten |
| 6,814,448 | B2 | 11/2004 | Ioka |
| 6,819,318 | B1 * | 11/2004 | Geng ............... 345/420 |
| 7,097,311 | B2 | 8/2006 | Jaynes et al. |
| 7,119,833 | B2 | 10/2006 | Jaynes et al. |
| 7,133,083 | B2 | 11/2006 | Jaynes et al. |
| 7,266,240 | B2 | 9/2007 | Matsuda |
| 2002/0024640 | A1 | 2/2002 | Ioka |
| 2002/0041364 | A1 | 4/2002 | Ioka |
| 2004/0085477 | A1 | 5/2004 | Majumder et al. |
| 2004/0169827 | A1 * | 9/2004 | Kubo et al. ............... 353/94 |
| 2005/0287449 | A1 | 12/2005 | Matthys et al. |
| 2007/0188719 | A1 | 8/2007 | Jaynes et al. |
| 2007/0195285 | A1 | 8/2007 | Jaynes et al. |
| 2007/0242240 | A1 | 10/2007 | Webb et al. |
| 2007/0268306 | A1 | 11/2007 | Webb et al. |
| 2008/0024683 | A1 | 1/2008 | Damera-Venkata et al. |
| 2008/0129967 | A1 | 6/2008 | Webb et al. |
| 2008/0180467 | A1 | 7/2008 | Jaynes et al. |
| 2009/0262260 | A1 | 10/2009 | Jaynes et al. |
| 2009/0284555 | A1 | 11/2009 | Webb et al. |

OTHER PUBLICATIONS

Webb, Stephen et al.; The DOME: A Portable Multi-Projector Visualization System for Digital Artifacts; IEEE Workshop on Emerging Display Technologies (w/VR 2005); Mar. 2005; Bonn, Germany.

Harville, Michael et al.; Practical Methods for Geometric and Photometric Correction of Tiled Projector Displays on Curved Surfaces; International Workshop on Projector-Camera Systems (ProCams 2006); Jun. 17, 2006; New York.

Fiala, Mark; Automatic Projector Calibration Using Self-Identifying Patterns; Proceedings of the 2005 IEEE Computer Society Conference on Computer Vision and Pattern Recognition (CVPR'05); 2005.

Griesser, Andreas et al.; Automatic Interactive Calibration of Multi-Projector-Camera Systems; Proceedings of the 2006 Conference on Computer Vision and Pattern Recognition Workshop; 2006.

Rehg, James et al.; Projected Light Displays Using Visual Feedback; Research at Intel; 2003; Intel Corporation.

International Search Report and Written Opinion dated Nov. 20, 2009 pertaining to International application No. PCT/US2009/040977.

Office Action pertaining to U.S. Appl. No. 11/675,226 dated Feb. 3, 2010.

Office Action pertaining to U.S. Appl. No. 11/737,817 dated Jan. 15, 2010.

* cited by examiner

FIG. 6
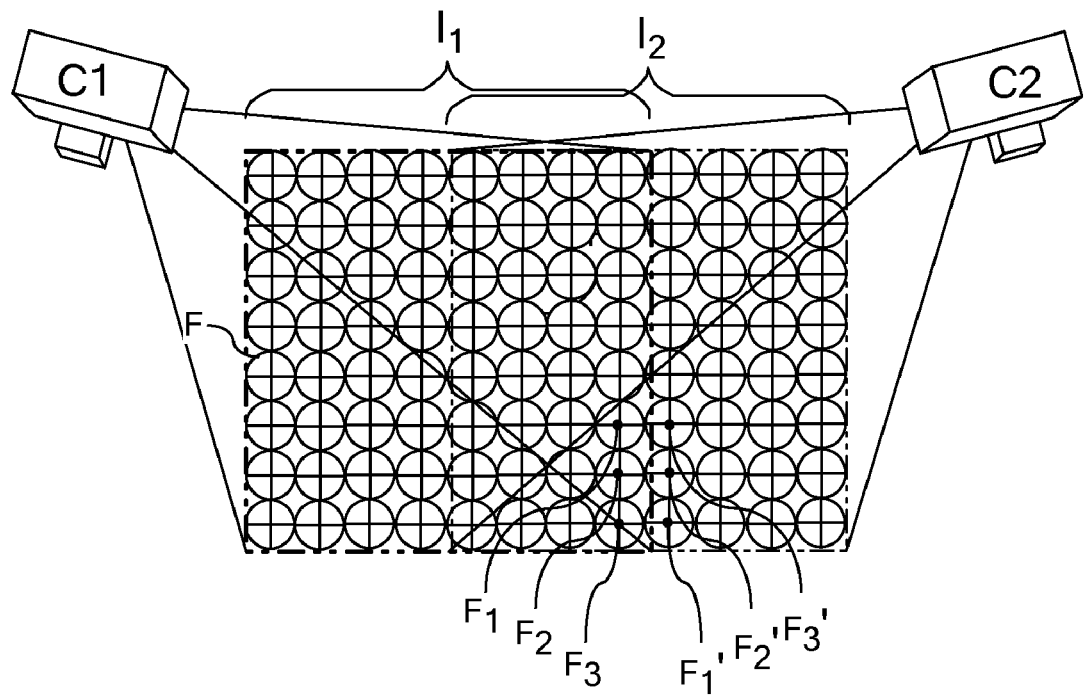
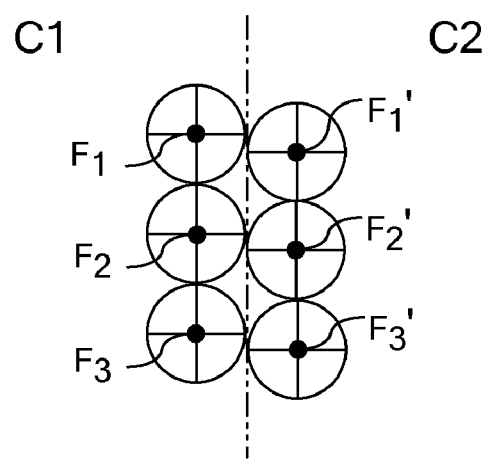
FIG. 7

US 7,740,361 B2

ALIGNMENT OPTIMIZATION IN IMAGE DISPLAY SYSTEMS EMPLOYING MULTI-CAMERA IMAGE ACQUISITION

CROSS-REFERENCE TO RELATED APPLICATIONS

This application claims the benefit of U.S. Provisional Application Ser. No. 60/745,348 (MES 0005 MA), filed Apr. 21, 2006. This application is related to commonly assigned, copending U.S. patent application Ser. No. 11/675,226 (MES 0001 PA), filed Feb. 15, 2007, Ser. No. 11/735,258 (MES 0002 PA), filed Apr. 13, 2007, Ser,. No. 11/737,817 (MES 0003 PA), filed Apr. 20, 2007, Ser. No. 11/737,821 (MES 0004 PA), filed Apr. 20, 2007, and Ser. No. 11/675,236 (MES 0009 PA), filed Feb. 15, 2007.

SUMMARY OF THE INVENTION

The present invention relates to projection systems where one or more projectors are utilized to project a video, a still image, or combinations thereof. More particularly, the present invention relates to methods of calibrating and operating such systems and to the nature in which these systems are programmed. According to one embodiment of the present invention, a method of operating an image display system is provided. The system comprises one or more projectors oriented to project an image on a projection screen and a plurality of image sensors oriented to acquire an image projected on the projection screen. According to the method, the image sensors acquire respective overlapping portions $I_1$, $I_2$ of a projected image. Screen position coordinates for image fiducials in the first and second portions $I_1$, $I_2$ of the projected image are identified and used to establish first and second sets of distance metrics $D_1$, $D_2$ for the first and second portions of the projected image. A global point set is constructed from the first and second sets of distance metrics $D_1$, $D_2$. Global points within a region where the first and second portions $I_1$, $I_2$ of the projected image overlap are derived from only one of the first and second sets of distance metrics $D_1$, $D_2$. In this manner, a first subset $G_1$ of the global point set will comprise fiducial positions derived from only one of the first and second sets of distance metrics $D_1$, $D_2$ and a second subset $G_2$ of the global point set will comprise fiducial positions derived from the other of the first and second sets of distance metrics $D_1$, $D_2$. Alignment of the first and second subsets $G_1$, $G_2$ of the global point set is optimized by adjusting fiducial positions in the global point set in a manner that at least partially accounts for differences between local positional data derived from the first and second sets of distance metrics $D_1$, $D_2$ and global positional data of the fiducial positions in the global point set.

Additional embodiments are disclosed and claimed, including but not limited to those where the projection system comprises a single image sensor that moves between measurements or is otherwise configured to acquire two overlapping portions $I_1$, $I_2$ of the projected image.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 6 and 7 are schematic illustrations of multi-camera image acquisition according to particular embodiments of the present invention;

DETAILED DESCRIPTION

Generally, various embodiments of the present invention relate to calibration techniques that utilize parametric models to generate geometric calibration data to calibrate an image display system including one or more image projectors and one or more image sensors positioned to acquire a projected image, or at least portions thereof. Although the calibration methodology of the present invention has broad applicability to any image projection system where an image or series of images are projected onto a viewing screen using one or more projectors, the methodology of the various embodiments of the present invention is described herein in the context of a multi-projector display system.

Figure 1:
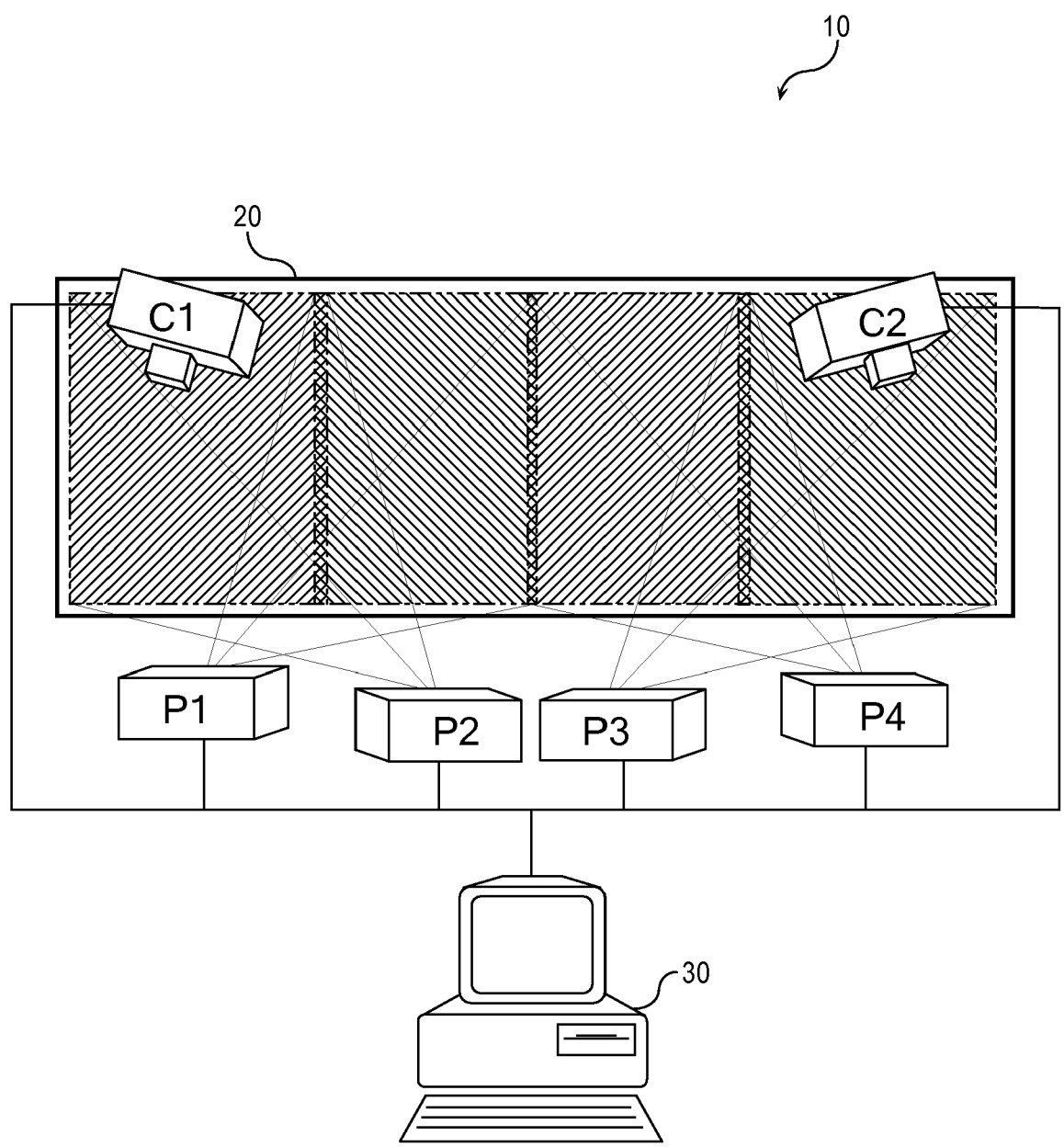
FIG. 1 is a schematic illustration of a projection system according to one or more embodiments of the present invention.

Referring initially to FIG. 1, a calibration method according to one embodiment of the present invention is illustrated in the context of an image display system 10 comprising a plurality of projectors P1, P2, P3, P4 oriented to project an image on a projection screen 20. Two cameras C1, C2 are oriented to acquire the image projected on the projection screen 20. A controller 30, illustrated as a programmable computer, is coupled to the projectors and cameras.

Figure 2:
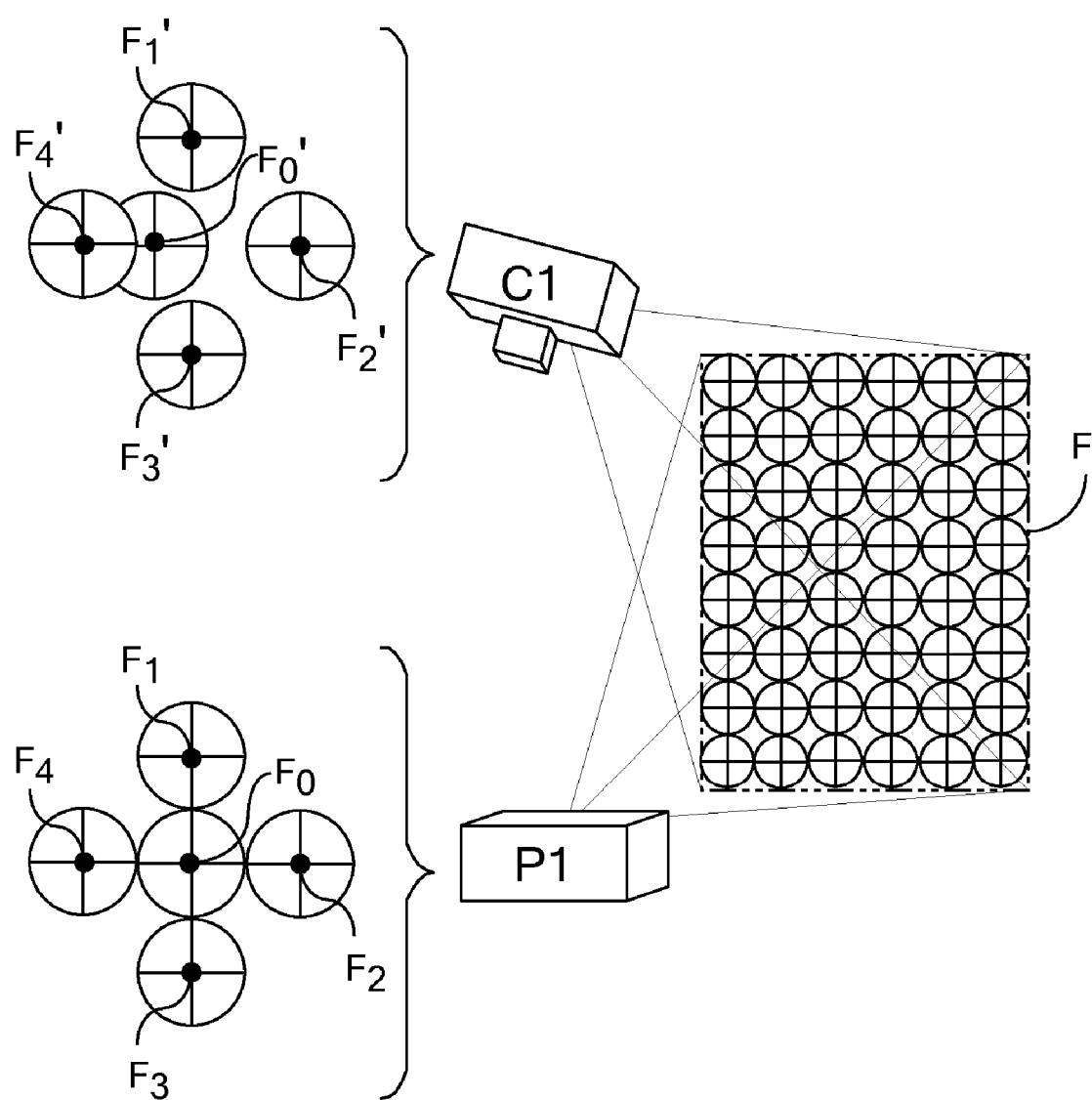
FIG. 2 is a schematic illustration related to image-based projector calibration according to one or more embodiments of the present invention.
Figure 3:
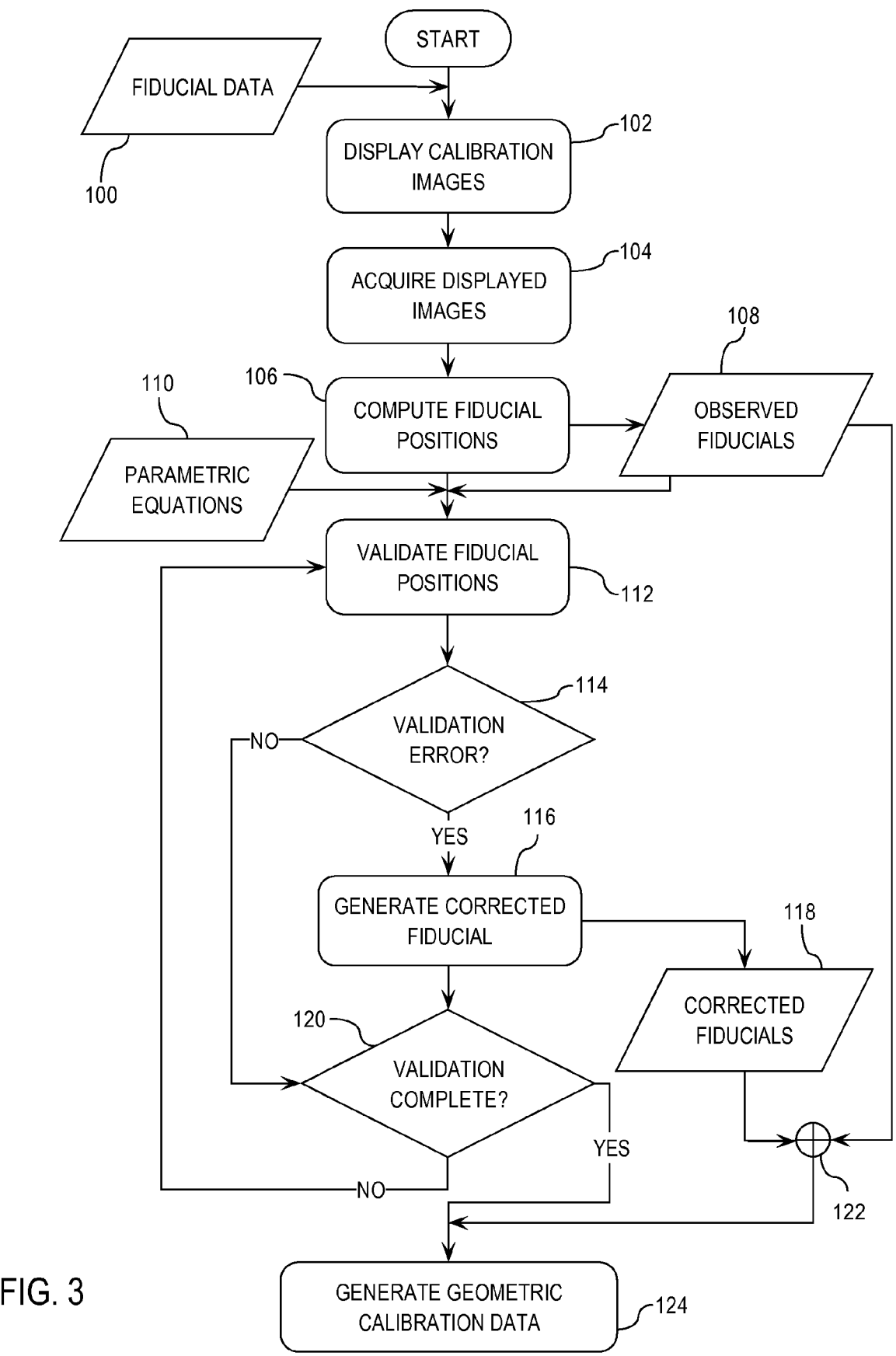
FIG. 3 is a flow chart illustrating calibration methodology according to one or more embodiments of the present invention.

Referring additionally to FIGS. 2 and 3, the projectors are initially operated to project a calibration image comprising a pattern or other representation of image fiducials F on the image projection screen 20 (see input 100 and step 102). Preferably, the geometry of the respective image fiducials F permits reliable identification of the spatial center of each fiducial F or some other spatially consistent reference point of each fiducial F. For example, and not by way of limitation, the respective image fiducials F may comprise circular 2D Gaussian images. In which case, spatially consistent reference points could be established by determining the respective centers-of-mass of the image fiducials or by fitting the parameters of a 2D Gaussian to the observed intensities and determining the maximal point of the Gaussian function. In the illustrated embodiment, the image fiducials F are illustrated as respective circles with two lines intersecting at the center of the circle. To identify a spatially consistent reference point across the set of image fiducials F, an image processing routine could first determine line equations that best fit the observed lines, and then compute the point of intersection of the two lines. In the case of a fiducial with a Gaussian intensity distribution, an image processing routine can first detect the fiducial region and then compute a center of mass of intensity for that region. These points of intersection are illustrated in FIG. 2 and can be used as an estimate of location of each fiducial image F.

For the purposes of describing and defining the present invention, it is noted that a calibration image may define a specific pattern of image fiducials F or may merely comprise an image for which feature locations within the image are known and are distinguishable in the camera. Indeed, reference herein to "image fiducials F" should be read broadly to cover any aspect of a calibration image that can be used to help identify feature locations within the image. A calibration image and the corresponding image fiducials F therein need not be limited to specific types of formal calibration images.

Once the image fiducials have been displayed, the cameras C1, C2, or other types of conventional or yet-to-be developed image sensors, are operated to acquire the projected calibration image(s) including the image fiducials F as projected on the projection screen 20 (see step 104). As is noted above, the respective positions of the image fiducials F within the pattern of fiducials as projected on the projection screen 20 can be calculated or otherwise identified collectively or on a fiducial-by-fiducial basis by suitable image processing software (see step 106 and output 108). As is illustrated in FIG. 2, because fiducial identification processes are commonly subject to measurement error arising from ambient lighting non-uniformity, irregularities in the display surface geometry, and irregularities in reflectance properties, the identified position of a given fiducial $F_0'$ relative to a set of neighboring fiducials $F_1'$-$F_4'$ in the image acquired by the camera C1 can vary significantly from the position of the fiducial $F_0$ relative to a set of neighboring fiducials $F_1$-$F_4$ defined by the projector P1. Although this type of measurement error can lead to visibly noticeable calibration/registration error in a wide variety of single and multi-projector display systems, it is particularly acute in display systems where two or more projectors are used to form a single, geometrically consistent image. According to one aspect of the present invention, this measurement error can be mitigated by using local parametric models to provide an estimate of the image measurement error for a given fiducial F. Further, the local parametric models and the estimate of the image measurement error may form a basis for replacing erroneous or missing measurements with values that conform to the model.

The fiducial positions identified in step 106 are validated to identify erroneous or missing image fiducials F in the acquired calibration image. To validate the fiducials, a parametric model is applied to compare respective ones of the identified fiducial positions with corresponding approximations of the identified fiducial positions (see inputs 108, 110 and step 112). As is illustrated in FIG. 2, the respective approximations that are used in the fiducial validation step can be calculated or otherwise determined by using positional data acquired for a neighborhood of image fiducials $F_1'$-$F_4'$ in the calibration image acquired by the camera C1, as projected on the projection screen 20. More specifically, the neighborhood of image fiducials $F_1'$-$F_4'$ are used in combination with a suitable local parametric model to approximate the identified fiducial position $F_0'$. To minimize error, the identified fiducial position $F_0'$ is excluded from the set of neighboring image fiducials $F_1'$-$F_4'$ when approximating the identified fiducial position $F_0'$.

The local parametric model used in the validation step preferably represents a mapping of the calibration image from the image projector P1 to the image sensor C1. More specifically, the parametric model can comprise one or more functions that are configured to predict the positions of individual image fiducials in a 2D frame of the image sensor C1 and can be created in a number of ways. For example, and not by way of limitation, the parametric functions can be created by applying (i) a least squares approximation to a neighborhood of image fiducials in the calibration image, (ii) a Levenberg-Marquardt algorithm parametric optimization technique, (iii) a simulated-annealing parametric optimization technique, (iv) a gradient descent parametric optimization technique, or combinations thereof.

In cases where the parametric functions are created by applying a least squares approximation to the neighborhood of image fiducials $F_1'$-$F_4'$ in the calibration image. In many cases, the parametric models will be derived from one or more dual variable, low order polynomials. For example, the following two-degree polynomial of the variables Px and Py could be used to approximate the 2D positions in the camera image of a projector point for a variety of projection screen geometries:

$$C_x = f(P_x, P_y)$$

$$C_y = g(P_x, P_y)$$

where $C_x$ and $C_y$ represent the x and y coordinates of a point in the image sensor frame, $P_x$ and $P_y$ represent the x and y coordinates of a point in the projector frame, and f and g represent coefficient scalars. Other functions that include constraints about the expected positions of points relative to one another can be used in the presence of additional information about the screen surface, radiometric properties of the display surface, or other auxiliary information. For example, linear homography techniques can be used to determine how points on a planar display surface will be observed using a projective sensing device such as a camera. This type of parametric model would have eight degrees of freedom and would be represented by a non-singular homogeneous 3×3 matrix resulting in a set of parametric equations.

In order to use the parametric equations to validate fiducial image locations, the parameters to the function should first be determined and, for each term in the polynomial function, a coefficient scalar value should be computed or, where linear homography techniques are used, the 8 free parameters of the matrix would need to the discovered. These coefficients can be computed by using a standard least-squares approximation technique. In order to compute the least squares approximation, first a neighborhood of fiducial points is chosen, and the corresponding projector and camera coordinates for each point in the neighborhood is added to a list. This list of (Px, Py)→(Cx, Cy) point correspondences represents input to output mappings that should be produced by the functions. By applying the least-squares estimation technique to these data, a function of best fit can be determined.

It is contemplated that several different parametric models can be fit to the local neighborhood of points in the case where an accurate parametric model is unavailable or unknown. In this case, the function of best fit both determines the parameters of the function as well as the parametric model that best describes the local neighborhood of fiducial locations.

For a given fiducial F that is in the projector frame buffer, a function is fit to the points in some neighborhood of F, but not including F. This function can then be used to predict the camera position of the image of F. If the observed position of the image of F differs from the predicted position by more than some minimum value, then a validation error is acknowledged (see step 114). The parametric models used in the validation process can be configured to account for the geometry of the projection screen, the projector geometry, or a combination thereof. Further, the particular parametric models used in validation may vary depending on the projected position of the image fiducial to be validated.

As is noted above, once a validation error is acknowledged or otherwise certified, a corrected fiducial can be generated and used to replace the observed image fiducial $F_O$ (see step 116). More specifically, the validation routine can be configured such that an error threshold determines when an observed fiducial is retained or replaced. Typically, the error threshold represents a distance metric between an identified fiducial position and an approximation of the identified fiducial position. The error threshold may be fixed or may vary as the projected positions of the image fiducials to be validated vary. One example of how a dynamic threshold value can be computed is to use the residual fit error of a least-squares approximation. This value can be related to how well the parametric function fits the input data, with lower values indicating a better fit.

The corrected fiducial positions generated at output 118 in FIG. 3 can be determined with reference to a fixed or dynamic correction factor. For example, the approximations of the identified fiducial positions can be used as the corrected fiducial positions or can at least form a partial basis for defining the corrected fiducial positions. It is also contemplated that the corrected fiducial positions can be computed as a combination of the identified fiducial positions and the approximations of the identified fiducial positions, i.e., by taking an average of the respective positions, an average weighted by the residual fit error, etc. In any case, geometric calibration data is constructed for the projector using corrected fiducial positions (see output 118) in place of fiducial positions for which errors have been certified. In the illustrated embodiment, an OR logic function 122 or other suitable routine is used to combine validated fiducial positions, as represented in the observed fiducials (see output 108), and the corrected fiducial positions generated in step 116 to generate a complete set of geometric calibration data for the projector (see step 124). This geometric calibration data is used to operate the projector in a calibrated projection mode.

As is noted above, the concepts of the present invention are equally applicable to single and multiple projector image display systems. Accordingly, it is contemplated that multiple projector image display systems incorporating aspects of the present invention can additionally be configured to include execution of conventional or yet-to-be developed multi-projector intensity blending routines.

As is noted above, the parametric models discussed herein can also be used to generate corrected image fiducials F that can be used to replace missing image fiducials when an image fiducial is not present in the acquired calibration image. To do so, the corrected fiducial position can be approximated from a neighborhood of image fiducials present in the calibration image, as projected on the projection screen, as long as a sufficient number of neighborhood points can be observed to ensure a minimum degree of accuracy.

Figure 4:
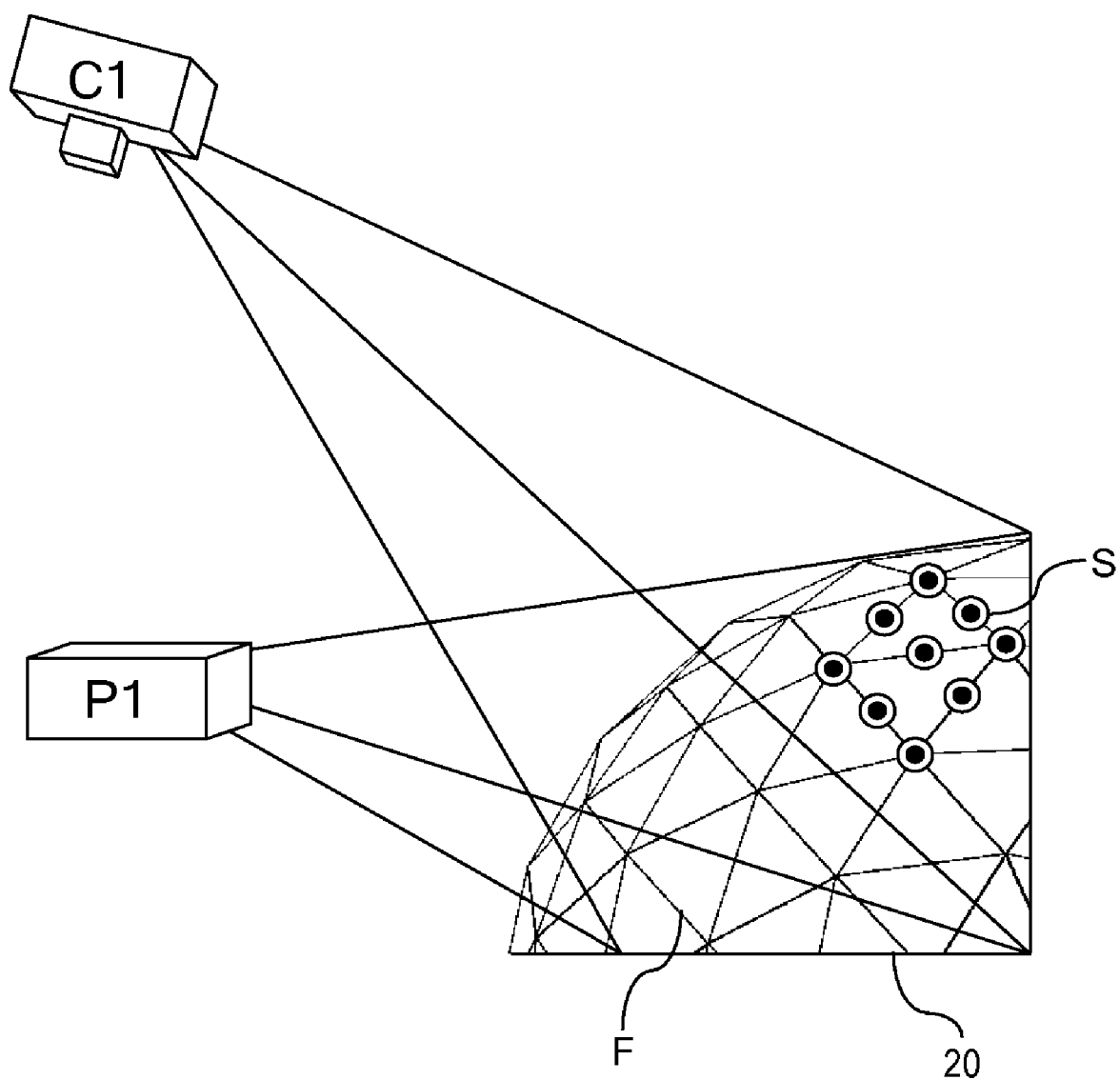
FIG. 4 is a schematic illustration of a projection system according to additional embodiments of the present invention.
Figure 5:
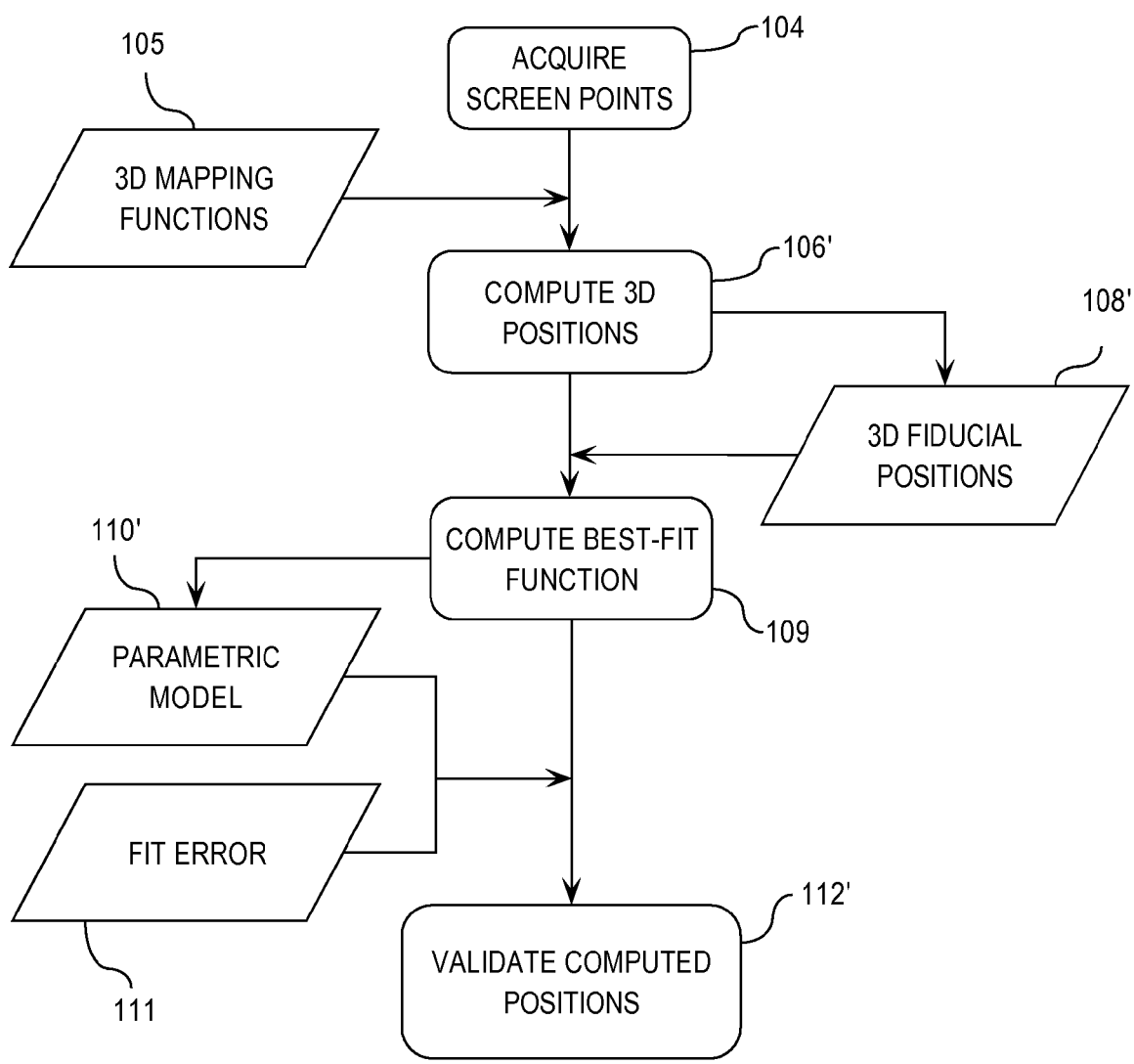
FIG. 5 is a flow chart illustrating calibration methodology according to one or more additional embodiments of the present invention.

An additional embodiment of the present invention is illustrated in FIGS. 4 and 5 with reference to a single camera/projector pair C1/P1, a virtual model 25 of a spherical projection screen, and a plurality of image fiducials F as they would be projected on the three-dimensional surface defined by the virtual screen 25. The image fiducials F are actually projected on a roughly spherical projection screen that is not shown in FIG. 4. The geometry of the actual projection screen is approximated using a parametric model that fits the screen.

In the embodiments of the present invention illustrated above with reference to FIGS. 1-3, the respective positions of the image fiducials projected on the projection screen were validated utilizing a parametric model that mapped two-dimensional projector points to two-dimensional camera points. In contrast, validation routines according to the additional embodiments of the present invention illustrated in FIGS. 4 and 5, map two-dimensional projector points to a three-dimensional cloud of virtual screen points $V_S$. For convenience of illustration, the image fiducials F are merely illustrated schematically in FIG. 4 with no representation of the actual geometry of the image fiducials F.

The aforementioned mapping from two-dimensional fiducial image locations to their position in a three-dimensional coordinate system can be accomplished by computing the inverse geometric mapping determined by the sensor and using an appropriate model of the display surface. In the case of a standard projective camera, this mapping could be represented as a 4×4 homogeneous projection matrix that is the inverse of the linear image formation process. Two-dimensional points multiplied by this matrix give rise to a ray that emanates from the camera center and passes through the image point. In this case, a three-dimensional point corresponding to the two-dimensional image fiducial is derived by computing the intersection of this ray with an appropriate model of the display surface. It is contemplated that this approach is not limited to linear relationships between two and three-dimensional points and that nonlinear distortion models can also be applied.

It should be noted that the present invention does not require that parameters of the model reflect the physical parameters of the system. For example, although the 4×4 projection matrix corresponding to a camera is determined in part by the camera focal length, image center, and other parameters, in most cases, a set of parameters that can be used to determine the two-dimensional to three-dimensional mapping is all that is required. In addition, the parameters chosen for the virtual display surface 25 do not necessarily need to reflect the actual physical display surface. Rather, if the parameterization of the display surface is appropriate, then the actual parameters are unimportant. For example, if the physical display surface can be described by a spherical parameterization, a quadric equation and its associated parameters may be sufficient to yield suitable results.

More specifically, referring to FIGS. 4 and 5, the projector P1 is operated to project a calibration image in the manner described above with reference to FIGS. 1-3. Similarly, the camera C1 is operated to acquire the projected calibration image as would be projected on the virtual screen 25 (see step 104). These and other similarities to the flow chart of FIG. 3 are represented in the flow chart of FIG. 5 through the use of like reference numbers for like block elements. For example, the image and virtual screen point acquisition steps illustrated in FIGS. 3 and 5 are each identified with reference number 104 because both relate to image acquisition via image sensors. Block elements in FIG. 5 that replace similar functionality represented in FIG. 3 have been delineated with the use of the corresponding reference number from FIG. 3 and the addition of a special punctuation following particular reference numbers in FIG. 5 (see, e.g., steps 106', 108', 110', 112'). Steps appearing for the first time in the flow chart of FIG. 5 and not being readily identifiable with steps presented in the flow chart of FIG. 3 have been delineated with new reference numbers (see, e.g., steps 105, 109, 111).

As is noted above, the embodiments of the present invention illustrated with reference to FIGS. 4 and 5 differ from those illustrated with reference to FIGS. 1-3 with respect to the manner in which the position coordinates of the image fiducials are identified. Specifically, in FIGS. 4 and 5, respective three-dimensional position coordinates of the image fiducials F, as would be projected on the virtual screen 25 are identified by applying one or more three-dimensional mapping functions (see input 105 and step 106'). These three-dimensional mapping functions represent the manner in which two-dimensional points in a projector frame map to three-dimensional points on the virtual projection screen 25 and are used to generate a set of three-dimensional fiducial positions (see step 108'). Once the set of three-dimensional fiducial positions have been generated, one or more three-dimensional parametric functions are fit to a neighborhood of fiducial points $V_S$ (see step 109). These parametric functions represent the known spatial constraints of points given the parameterization of the display surface. For example three-dimensional parametric functions could include three-dimensional planar equations, three-dimensional spheres, quadrics, or constrained three-dimensional splines. These best-fit functions are used to generate one or more parametric models (see step 110') and the parametric models are used to validate the fiducial positions previously identified in steps 106' and 108' (see steps 112'). The validation process can be further modified by a fit error routine to help account for error in the process of fitting the parametric functions to the point cloud defined by the neighborhood of points $V_S$.

The validation process of FIGS. 4 and 5 is analogous to that illustrated above with respect to FIGS. 1-3 in the sense that the parametric model is used to generate approximations of the identified fiducial positions. These approximations are then compared to respective ones of the identified fiducial positions and validation errors are certified when a result of one of the comparisons exceeds an error threshold. Geometric calibration data is generated and used for the projector using validated and corrected fiducial positions in the manner similar to that illustrated above with respect to FIGS. 1-3. More specifically, the corrected fiducial positions can be determined with reference to a fixed or dynamic correction factor. For example, the approximations of the identified fiducial positions can be used as the corrected fiducial positions or can at least form a partial basis for defining the corrected fiducial positions. It is also contemplated that the corrected fiducial positions can be computed as a combination of the identified fiducial positions and the approximations of the identified fiducial positions, i.e., by taking an average of the respective positions, an average weighted by the residual fit error, etc.

Accordingly, the aspect of the present invention described herein with reference to FIGS. 4 and 5 is similar to the image-based parametric model fitting procedure described with reference to FIGS. 1-3. However, the technique operates on three-dimensional point clouds to inspect local neighborhoods of points to determine how consistent these points are to a local model. In the calibration routines of FIGS. 1-3, two-dimensional projector points are mapped to two-dimensional camera points. In contrast, the calibration methods illustrated with reference to FIGS. 4 and 5 utilize functions that map two-dimensional projector points to three-dimensional virtual screen points and can be used when three-dimensional position estimates are known for the fiducial points. The technique involves computing a best fit parametric function to a local neighborhood of points and then using this function (along with fit error) to validate the computed positions of fiducial points.

It is noted that FIG. 4 illustrates embodiments of the present invention with reference to a single camera/projector pair C1/P1 and a spherical projection screen merely for convenience and clarity. It is contemplated that the inventive concepts illustrated with reference to FIG. 4 have broad applicability to display systems incorporating more complex projection and image sensing configurations and a wide variety of three-dimensional screen configurations including, but not limited to, spheres, cylinders, planes, quadrics, etc.

The two techniques described above with reference to FIGS. 1-5 provide a means for computing accurate, locally consistent geometric alignment data for a single camera frame. However, when multiple camera views are used to acquire a calibration image, local consistency can be lost because it is difficult to precisely and accurately model the image display, formation, processing steps, and the relative geometry between the image sensors. Accordingly, the estimated positions of fiducials in the calibration image are subject to error. For example, the camera lens may induce radial distortion, or the camera pose estimation may not be accurate. These and other similar sources of error do not typically disrupt the local consistency of fiducial points observed within a single camera, but can create inconsistent measurements when compared with measurements made by a second camera.

For example, referring to FIGS. 6 and 7, a pair of video cameras or other type of image sensors C1, C2 are positioned to acquire overlapping portions $I_1$, $I_2$ of a calibration image containing a pattern of image fiducials F on a planar display surface. In operation, the first camera C1 acquires the left half of the display while the second camera C2 acquires the right half of the display. A set of points in the center of the screen, i.e., where the fields-of-view of the cameras C1, C2 overlap, are observed by both cameras C1, C2. Referring to the particular fiducial reference points $F_1$-$F_6$ called out in FIGS. 6 and 7, the screen positions of points $F_1$, $F_2$, and $F_3$, as observed by the first camera C1, are likely to differ from the screen positions of these same points $F_1$, $F_2$, and $F_3$, as observed by the second camera C2. As a result, if the first camera C1 is used to acquire points $F_1$, $F_2$, and $F_3$ and the second camera C2 is used to acquire adjacent points $F_1'$, $F_2'$, and $F_3'$, the respective positions of the fiducial reference points $F_1$-$F_3$ and $F_1'$-$F_3'$ will not be locally consistent. An example of a simple type of local inconsistency is illustrated in FIG. 7, where the points $F_1'$, $F_2'$, and $F_3'$, as acquired by the second camera C2 are not aligned with the points $F_1$, $F_2$, and $F_3$, as observed by the first camera C1. This type of misalignment or local inconsistency could occur anywhere in the calibration image where two different image sensors acquire adjacent sets of fiducial points.

As is noted above, if the first camera C1 is used to observe a given set of fiducial points in an image, then other adjacent points observed by the first camera C1 will be locally consistent but adjacent points observed by a second camera C2 will not be locally consistent. Similarly, if the second camera C2 is used to observe the given set of fiducial points in the image, then adjacent points observed by the first camera C1 will appear erroneous. To address this issue, the embodiments of the present invention illustrated with reference to FIGS. 6-11, use observations from both cameras to produce point sets that are more locally consistent throughout the image. Generally, this object is achieved by using local distance measurements from within a single sensor, but can create inconsistent measurements when compared with measurements made by a second sensor or a single sensor that takes multiple measurements of the display from different positions.

Referring collectively to FIGS. 8-11, local positional data is initially acquired by operating separate image sensors to acquire respective portions $I_1$, $I_2$ of an image projected on a projection surface. This acquired image data can be made available for processing by providing suitable inputs illustrated schematically as blocks 200 and 202 in FIG. 8. Screen position coordinates for image fiducials in the first and second portions $I_1$, $I_2$ of the projected image can be identified from the acquired image data in a variety of conventional and yet-to-be developed ways. For example, referring to step 204 of FIG. 8, the screen position coordinates for image fiducials in the first and second portions $I_1$, $I_2$ of the projected calibration image can be identified by utilizing one or more projector-to-screen mapping functions.

It is contemplated that various methods for computing projector/screen mapping functions will be suitable for use in the context of the present invention. For example if the camera image coordinates are related to the screen coordinates by a two-dimensional linear transform, as may be the case when a camera is observing a flat display screen, then the screen coordinates can be computed by applying this transform to the observed image coordinates. Alternatively if the screen is a spherical shape with a known radius and camera parameters such as the intrinsic lens parameters, extrinsic position/orientation camera parameters, etc., are known, then screen coordinates can be computed from camera image coordinates.

In order for the local distance computation to be applied as a global constraint in the manner described herein, fiducial points observed near the edge of a camera frame are observed by at least one additional camera or by the same camera, adjusted to acquire an image in a different field of view. That is, the respective view volumes of the cameras overlap. This relationship is illustrated in FIG. 6, discussed above, where the image sensors C1, C2 are configured such that the respective portions $I_1$, $I_2$ overlap each other in the projected image.

Figure 8:
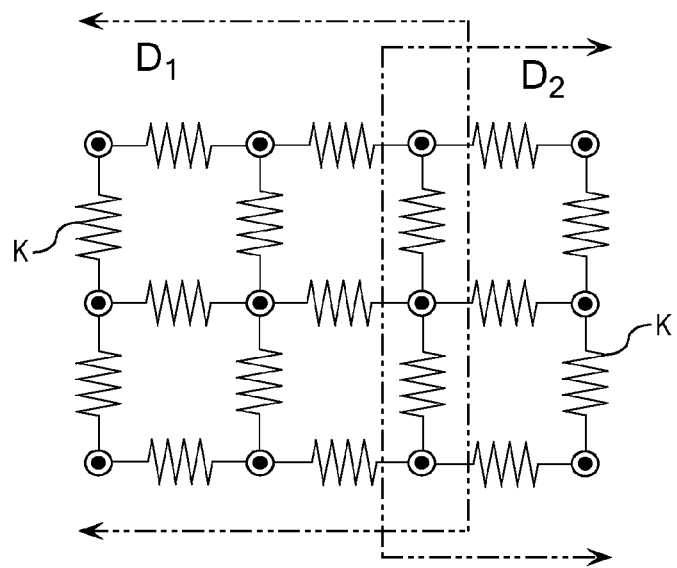
FIGS. 8 and 9 are schematic illustrations of the manner in which virtual springs can be assigned to acquired image points according to particular embodiments of the present invention.

Once the screen position coordinates for the image fiducials in the first and second portions $I_1$, $I_2$ of the projected image have been identified (see step 204), first and second sets of distance metrics $D_1$, $D_2$ are established to facilitate computation of the respective distances between adjacent points in the first and second portions $I_1$, $I_2$ of the projected image. Referring specifically to FIG. 8, the first set of distance metrics $D_1$ is established for the first portion $I_1$ of the projected image by utilizing the identified screen position coordinates to determine respective distances between adjacent points in the first portion $I_1$ of the projected image. Similarly, the second set of distance metrics $D_2$ is established for the second portion $I_2$ of the projected image by utilizing the identified screen position coordinates to determine respective distances between adjacent points in the second portion $I_2$ of the projected image. These distance measurements can then be made available for further processing (see output blocks 208, 210).

The first and second sets of distance metrics $D_1$, $D_2$ illustrated in FIG. 8 can be used to construct a global point set (see step 212). In constructing the global point set, points within a region where the first and second portions $I_1$, $I_2$ of the projected image overlap are derived from only one of the respective sets of distance metrics $D_1$, $D_2$. In this manner, referring to FIG. 9, a first subset $G_1$ of the global point set will comprise fiducial positions derived from only one of the sets of distance metrics $D_1$, $D_2$ while the second subset $G_2$ of the global point set will comprise fiducial positions derived from the remaining set of distance metrics $D_1$, $D_2$. As a result, the respective subsets of points within the global point set are subject to misalignment wherever the respective image sensors used to acquire the projected image are not perfectly matched and modeled.

Figure 9:
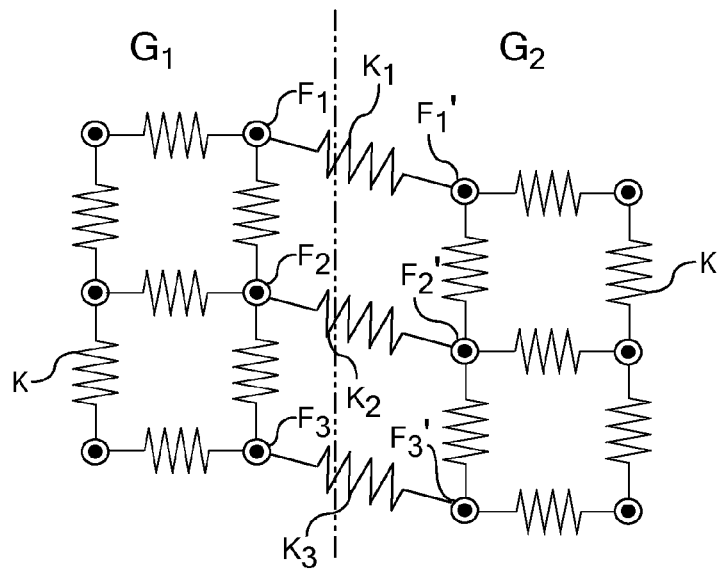

More specifically, for each camera view there is a set of points observed by that camera and a set of distances to adjacent points within the set. A global point set is constructed by adding points from each of the local camera point sets. When a given projector point is observed in two or more different cameras, it is added to the global point set only once. After all of the points have been added to the global point set, adjacent points in the global set are assigned a pair-wise error that can be thought of as a spring that connects those two points where the tension in the spring is the error to be reduced. Each pair of points is connected with a virtual spring. The length assigned to these springs is the local distance measurement as derived from the first and second sets of distance metrics $D_1$, $D_2$. In cases where adjacent points were observed by the same camera, the length assigned to the spring will be the same as the distance between the two points. In cases where the adjacent points were observed by two different cameras, the length assigned to the spring will be different than the distance between the two points. This discrepancy arises because the length estimate is derived from the positions as computed by a single camera view, while the two points in the global set came from two different camera views. A simple example of misalignment is illustrated schematically in FIG. 9 and it is noted that a variety of additional degrees and types of misalignments are contemplated by the present invention, including but not limited to those that are much more complex and less predictable than that which is illustrated in FIG. 9.

The alignment of the first and second subsets $G_1$, $G_2$ of the global point set can be optimized according to particular embodiments of the present invention by adjusting fiducial positions in the global point set in a manner that at least partially accounts for differences between local positional data derived from the first and second sets of distance metrics $D_1$, $D_2$ and global positional data representing the fiducial positions in the global point set. For example, and not by way of limitation, the alignment of the first and second subsets $G_1$, $G_2$ of the global point set can be optimized by assigning virtual springs K to intervening spaces between points in the global point set (see step 214). Positional data derived from the first and second sets of distance metrics $D_1$, $D_2$ is used to establish equilibrium values for each virtual spring assigned to an intervening spaces between two adjacent points in the global point set. Referring to the ideal case illustrated in FIG. 8, where all of the points in the global point set are properly aligned, each virtual spring K will be in an equilibrium condition because its length will be equal to the point spacing derived from the first and second sets of distance metrics $D_1$, $D_2$. In the case of the misaligned subsets $G_1$, $G_2$ illustrated in FIG. 9, the equilibrium lengths assigned to the springs $K_1$, $K_2$, $K_3$ extending between points $F_1/F_1'$, $F_2/F_2'$, and $F_3/F_3'$ in the adjacent subsets $G_1$, $G_2$ are shorter than the actual separation between the adjacent points, as derived from the first and second sets of distance metrics $D_1$, $D_2$. Accordingly, the springs $K_1$, $K_2$, $K_3$ are illustrated in an extended state and will exert force on the linked points. The force vectors from the complete set of virtual springs can be used as a global constraint to optimize alignment of the adjacent subsets $G_1$, $G_2$ (see step 216).

For example, a global constraint error minimization routine can be configured as an iterative function that attempts to minimize the total error of the system. The total error of the global point system can be determined by computing the total of the net force acting on each point in the system. An error minimization process, then, is the process of moving points locally in order to achieve a global minimum in the net spring force acting on all points. It is contemplated that the net spring force can be minimized through a non-iterative process when a closed-form equation of global energy in the spring system is available. It is also contemplated that spring energy implies a particular relationship of error to distance, i.e., the force equation for a spring with a particular spring constant, and that other errors could be applied in practicing the present invention. For example, given a desired distance, error E could be computed as a cubic:

$$E=(d_1-d_2)^3$$

where $(d_1-d_2)$ represents the difference between a desired distance and the current distance. Indeed, any error metric based on the relative distances between points in the point set would be appropriate in practicing the present invention.

In detail, the technique proceeds as follows: For each point in the global point set, the tension in the virtual spring K connecting adjacent points is computed as the ratio of the distance between the points to the length of the spring connecting them. A ratio of 1 corresponds to a spring that is at rest, and therefore has no tension. A ratio greater than 1 indicates a stretched spring, with tension pulling the two end points together. A ratio of less than 1 indicates a compressed spring with a tension that tends to force the two endpoints apart. These force values are scaled by the spring constant, which can be different for each connection in the grid. The spring constant could be increased, for example, for points which were observed with a high degree of accuracy, or which fit a parametric model very closely. Points which do not fit the parametric model, or are otherwise considered to be lower accuracy estimates, can be assigned lower spring constants. In this manner, the points which are believed to be more accurate have a more significant influence on the structure of the calibration mesh. These forces can be represented as vectors and can be computed for each point in the global point set. The net force across the global point set can be computed using vector addition.

Figure 10:
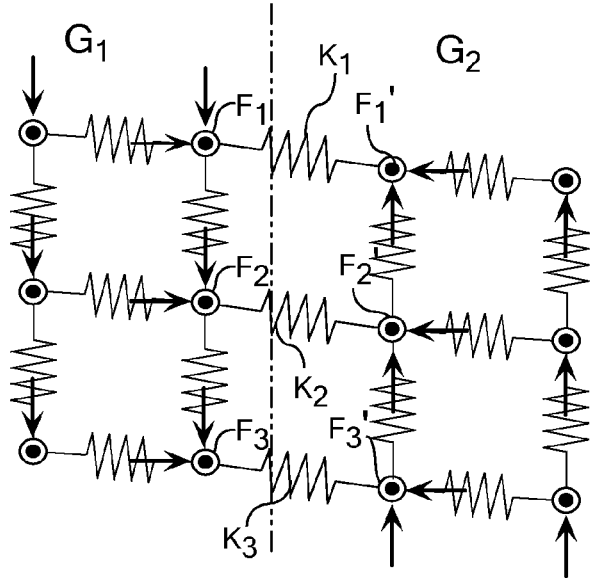
FIG. 10 is a schematic representation of an error minimization routine according to particular embodiment of the present invention.
Figure 11:
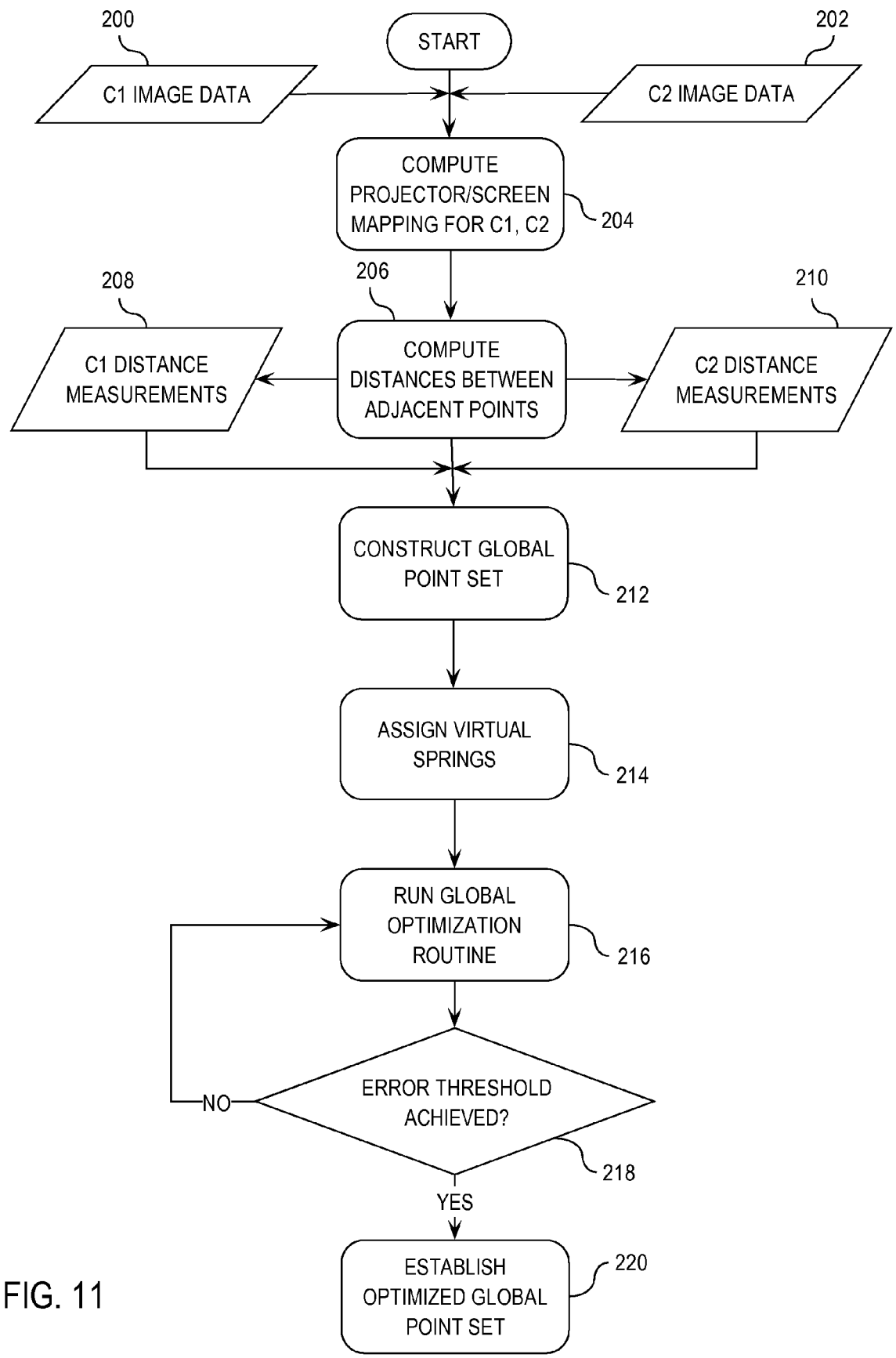
FIG. 11 is a flow chart illustrating a manner in which adjusted global point sets can be established in operating image display systems according to particular embodiments of the present invention.

As is illustrated in FIG. 10, once the net force acting on each point in the global system has been computed, the positions of the points are adjusted iteratively in order to reduce the global error in the system. Using a priority queue in which the force vectors associated with each virtual spring are stored, the point with the largest net force is evaluated. A new position is computed for this point which minimizes the net force acting on the point. Alternatively, the new position may be computed which reduces the force by ½, or reduces the force to some fraction of the value of the next highest force position. This or other such damping techniques can be used in order to reduce secondary effects of changing the position of a point. After a new position has been computed for a given point, the tension acting on that point is computed and the point and tension is resubmitted to the priority queue. Similarly, all points which are adjacent to the point at issue are also re-evaluated and the position in the priority queue is updated. This process repeats until some error threshold is achieved (see FIG. 11, step 218). For instance the average net force, maximum net force, or total net force in the system could be used. Note that as a result of this process it is possible that every point in the global system could have a position in the optimized point set that is different than what was computed from any camera position, but that local consistency between adjacent points will be maintained. Also note that the spring grid relaxation/optimization which was described here is not the only method that can be used to apply the set of global constraints to the data.

Once a predetermined error threshold is reached, an optimized global point set is established and can be used to operate the projector in a calibrated projection mode or some other projection mode that is at least partially dependent on the optimized alignment of the global point set.

Although the embodiments of the present invention illustrated herein with reference to FIGS. 6-11 relate to a dual camera embodiment with overlapping fields of view, it is noted that any number of image acquisition sensors can be incorporated into the systems described herein. Further, the respective fields of view defined by the image sensor or sensors may overlap in a variety of ways, whether or not the anticipated overlap is substantially uniform, as is illustrated in FIG. 6, or irregular, as may be the case in many embodiments of the present invention.

It is noted that recitations herein of a component of the present invention being "configured" or "programmed" to embody a particular property, function in a particular manner, etc., are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating an image display system comprising one or more projectors oriented to project an image on a projection screen and a plurality of image sensors or a single, multi-view sensor configured to acquire overlapping portions of an image projected on the projection screen, the method comprising:

operating the projector to project an image comprising one or more image fiducials on the image projection screen;

operating the one or more image sensors to acquire first and second portions $I_1$, $I_2$ of the projected image such that the first and second portions $I_1$, $I_2$ overlap each other in the projected image;

identifying screen position coordinates for image fiducials in the first and second portions $I_1$, $I_2$ of the projected image;

establishing a first set of distance metrics $D_1$ for the first portion $I_1$ of the projected image by utilizing the identified screen position coordinates to determine respective distances between adjacent points in the first portion $I_1$ of the projected image;

establishing a second set of distance metrics $D_2$ for the second portion $I_2$ of the projected image by utilizing the identified screen position coordinates to determine respective distances between adjacent points in the second portion $I_2$ of the projected image;

constructing a global point set from the first and second sets of distance metrics $D_1$, $D_2$ wherein points within a region where the first and second portions $I_1$, $I_2$ of the projected image overlap are derived from only one of the first and second sets of distance metrics $D_1$, $D_2$ such that a first subset $G_1$ of the global point set comprises fiducial positions derived from only one of the first and second sets of distance metrics $D_1$, $D_2$ and a second subset $G_2$ of the global point set comprises fiducial positions derived from the other of the first and second sets of distance metrics $D_1$, $D_2$;

optimizing alignment of the first and second subsets $G_1$, $G_2$ of the global point set by adjusting fiducial positions in the global point set in a manner that at least partially accounts for differences between local positional data derived from the first and second sets of distance metrics $D_1$, $D_2$ and global positional data of the fiducial positions in the global point set; and operating the projector in a manner that is at least partially dependent on the optimized alignment of the global point set.

2. A method as claimed in claim 1 wherein the screen position coordinates for image fiducials in the first and second portions $I_1$, $I_2$ of the projected image are identified by utilizing one or more projector-to-screen mapping functions.

3. A method as claimed in claim 1 wherein:
the first set of distance metrics $D_1$ comprises positional data representing the separation of fiducial positions in the first portion $I_1$ of the projected image; and
the second set of distance metrics $D_2$ comprises positional data representing the separation of fiducial positions in the second portion $I_2$ of the projected image.

4. A method as claimed in claim 1 wherein the global point set is constructed such that:
the first subset $G_1$ of the global point set comprises a first set of fiducial positions $F_1$, $F_2$, $F_i$ derived from only one of the first and second sets of distance metrics $D_1$, $D_2$; and
the second subset GHd 2 of the global point set comprises a second set of fiducial positions $F_1'$, $F_2'$, $F_i'$ that are adjacent the first set of fiducial positions and are derived from the other of the first and second sets of distance metrics $D_1$, $D_2$.

5. A method as claimed in claim 1 wherein the alignment of the first and second subsets $G_1$, $G_2$ of the global point set is optimized by reducing the degree to which an actual separation between the first set of fiducial positions $F_1$, $F_2$, $F_i$ and the adjacent second set of fiducial positions $F_1'$, $F_2'$, $F_i'$ varies from an expected separation derived from one of the first and second sets of distance metrics $D_1$, $D_2$.

6. A method as claimed in claim 1 wherein the alignment of the first and second subsets $G_1$, $G_2$ of the global point set is optimized by using data derived from the first and second sets of distance metrics $D_1$, $D_2$ to assign virtual springs to intervening spaces between points in the global point set.

7. A method as claimed in claim 6 wherein the alignment of the first and second subsets $G_1$, $G_2$ of the global point set is optimized by minimizing an error function that is related to spring forces acting on the points in the global point set.

8. A method as claimed in claim 6 wherein the virtual springs exert force on the points in the global point set when the spacing between adjacent points in the global point set varies from an expected value derived from the first and second sets of distance metrics $D_1$, $D_2$.

9. A method as claimed in claim 8 wherein alignment of the first and second subsets $G_1$, $G_2$ of the global point set is optimized by minimizing the total net spring force acting on the points in the global point set.

10. A method as claimed in claim 8 wherein alignment of the first and second subsets $G_1$, $G_2$ of the global point set is optimized by minimizing the maximum spring force acting on the points in the global point set.

11. A method as claimed in claim 8 wherein alignment of the first and second subsets $G_1$, $G_2$ of the global point set is optimized by minimizing the average spring force acting on the points in the global point set.

12. A method as claimed in claim 8 wherein the net spring force is minimized in an iterative process until a predetermined error threshold is reached.

13. A method as claimed in claim 8 wherein the net spring force is minimized through a non-iterative process when a closed-form equation of global energy is available.

14. A method as claimed in claim 6 wherein the virtual springs are assigned such that the respective spring constant of each virtual spring is a function of the position within the global point set of the intervening space to which it is assigned.

15. A method as claimed in claim 14 wherein alignment is optimized by designating varying degrees of expected accuracy to particular zones or points within the global point set and assigning elevated spring constants to virtual springs associated with zones or points of relatively high degrees of expected accuracy.

16. A method as claimed in claim 1 wherein the method further comprises utilizing the optimized global point set to operate the projector in a calibrated projection mode.

17. A method of calibrating an image display system comprising one or more projectors oriented to project an image on a projection screen and a plurality of image sensors or a single, multi-view sensor configured to acquire overlapping portions of an image projected on the projection screen, the method comprising:
operating the projector to project a calibration image comprising one or more image fiducials on the image projection screen;
operating the one or more image sensors to acquire first and second portions $I_1$, $I_2$ of the projected calibration image such that the first and second portions $I_1$, $I_2$ overlap each other in the projected calibration image;
identifying screen position coordinates for image fiducials in the first and second portions $I_1$, $I_2$ of the projected calibration image;
establishing a first set of distance metrics $D_1$ for the first portion $I_1$ of the projected calibration image by utilizing the identified screen position coordinates to determine respective distances between adjacent points in the first portion $I_1$ of the projected calibration image;
establishing a second set of distance metrics $D_2$ for the second portion $I_2$ of the projected calibration image by utilizing the identified screen position coordinates to determine respective distances between adjacent points in the second portion $I_2$ of the projected calibration image;
constructing a global point set from the first and second sets of distance metrics $D_1$, $D_2$ wherein a first subset $G_1$ of the global point set comprises fiducial positions derived from only one of the first and second sets of distance metrics $D_1$, $D_2$ and a second subset $G_2$ of the global point set comprises fiducial positions derived from the other of the first and second sets of distance metrics $D_1$, $D_2$;
optimizing alignment of the first and second subsets $G_1$, $G_2$ of the global point set by adjusting fiducial positions in the global point set in a manner that at least partially accounts for differences between local positional data derived from the first and second sets of distance metrics $D_1$, $D_2$ and global positional data of the fiducial positions in the global point set;

utilizing the optimized global point set to operate the projector in a calibrated projection mode.

18. A method as claimed in claim 17 wherein:

the alignment of the first and second subsets $G_1$, $G_2$ of the global point set is optimized by using data derived from the first and second sets of distance metrics $D_1$, $D_2$ to assign virtual springs to intervening spaces between points in the global point set;

the virtual springs exert force on the points in the global point set when the spacing between adjacent points in the global point set varies from an expected value derived from the first and second sets of distance metrics $D_1$, $D_2$; and alignment of the first and second subsets $G_1$, $G_2$ of the global point set is optimized by minimizing the total net spring force, the maximum spring force, and/or the average spring force acting on the points in the global point set.

19. An image display system comprising one or more projectors oriented to project an image on a projection screen, a plurality of image sensors or a single, multi-view sensor configured to acquire an image projected on the projection screen, and one or more controllers programmed to operate the projectors, wherein:

the projector projects an image comprising one or more image fiducials on the image projection screen;

the image sensors acquire first and second portions $I_1$, $I_2$ of the projected image such that the first and second portions $I_1$, $I_2$ overlap each other in the projected image;

the system identifies screen position coordinates for image fiducials in the first and second portions $I_1$, $I_2$ of the projected image;

the system establishes a first set of distance metrics $D_1$ for the first portion $I_1$ of the projected image by utilizing the identified screen position coordinates to determine respective distances between adjacent points in the first portion $I_1$ of the projected image;

the system establishes a second set of distance metrics $D_2$ for the second portion $I_2$ of the projected image by utilizing the identified screen position coordinates to determine respective distances between adjacent points in the second portion $I_2$ of the projected image;

the system construct a global point set from the first and second sets of distance metrics $D_1$, $D_2$ wherein points within a region where the first and second portions $I_1$, $I_2$ of the projected image overlap are derived from only one of the first and second sets of distance metrics $D_1$, $D_2$ such that a first subset $G_1$ of the global point set comprises fiducial positions derived from only one of the first and second sets of distance metrics $D_1$, $D_2$ and a second subset $G_2$ of the global point set comprises fiducial positions derived from the other of the first and second sets of distance metrics $D_1$, $D_2$;

the system optimize alignment of the first and second subsets $G_1$, $G_2$ of the global point set by adjusting fiducial positions in the global point set in a manner that at least partially accounts for differences between local positional data derived from the first and second sets of distance metrics $D_1$, $D_2$ and global positional data of the fiducial positions in the global point set; and the projector operates in a manner that is at least partially dependent on the optimized alignment of the global point set.

20. A method of operating an image display system comprising one or more projectors oriented to project an image on a projection screen and a plurality of image sensors or a single, multi-view sensor configured to acquire overlapping portions of an image projected on the projection screen, the method comprising:

operating the projector to project an image comprising one or more image fiducials on the image projection screen;

operating the one or more image sensors to acquire first and second portions $I_1$, $I_2$ of the projected image such that the first and second portions $I_1$, $I_2$ overlap each other in the projected image;

identifying screen position coordinates for image fiducials in the first and second portions $I_1$, $I_2$ of the projected image;

establishing a first set of distance metrics $D_1$ for the first portion $I_1$ of the projected image by utilizing the identified screen position coordinates to determine respective distances between adjacent points in the first portion $I_1$ of the projected image;

establishing a second set of distance metrics $D_2$ for the second portion $I_2$ of the projected image by utilizing the identified screen position coordinates to determine respective distances between adjacent points in the second portion $I_2$ of the projected image;

constructing a global point set from the first and second sets of distance metrics $D_1$, $D_2$ wherein points within a region where the first and second portions $I_1$, $I_2$ of the projected image overlap are derived from only one of the first and second sets of distance metrics $D_1$, $D_2$ such that a first subset $G_1$ of the global point set comprises fiducial positions derived from only one of the first and second sets of distance metrics $D_1$, $D_2$ and a second subset $G_2$ of the global point set comprises fiducial positions derived from the other of the first and second sets of distance metrics $D_1$, $D_2$;

optimizing alignment of the first and second subsets $G_1$, $G_2$ of the global point set by adjusting fiducial positions in the global point set in a manner that uses virtual springs assigned to intervening spaces between points in the global point set and at least partially accounts for differences between local positional data derived from the first and second sets of distance metrics $D_1$, $D_2$ and global positional data of the fiducial positions in the global point set; and operating the projector in a manner that is at least partially dependent on the optimized alignment of the global point set.

* * * * *

UNITED STATES PATENT AND TRADEMARK OFFICE
CERTIFICATE OF CORRECTION

PATENT NO. : 7,740,361 B2
APPLICATION NO. : 11/737823
DATED : June 22, 2010
INVENTOR(S) : Christopher O. Jaynes et al.

It is certified that error appears in the above-identified patent and that said Letters Patent is hereby corrected as shown below:

Column 13, Line 39, "subset $GH_d2$" should read --subset $G_2$--;
Column 15, Line 47, "construct a" should read --constructs a--; Line 58, "optimize" should read --optimizes--;

Signed and Sealed this

Sixteenth Day of November, 2010

David J. Kappos
*Director of the United States Patent and Trademark Office*